United States Patent [19]

Pea et al.

[11] Patent Number: 4,889,964

[45] Date of Patent: Dec. 26, 1989

[54] ROTATING RETRACTABLE CAM LIMIT SWITCH

[75] Inventors: Kevin I. Pea, Mayville, Wis.; David M. Tenniswood, Birmingham, Mich.; Steven M. Loeck, Beaver Dam, Wis.

[73] Assignee: Gleason Reel Corp., Mayville, Wis.

[21] Appl. No.: 352,361

[22] Filed: May 15, 1989

Related U.S. Application Data

[63] Continuation-in-part of Ser. No. 166,654, Mar. 11, 1988, abandoned.

[51] Int. Cl.[4] ...................... H01H 19/62; H01H 3/42; F16H 53/00

[52] U.S. Cl. ................................ 200/31 R; 74/568 R; 200/38 BA; 200/38 CA; 200/574

[58] Field of Search ...................... 200/19 R, 23, 27 R, 200/27 B, 30 R, 31 R, 31 A, 33 B, 35 R, 38 R, 38 B, 38 BA, 38 C, 38 CA, 47, 567, 573, 574; 74/568 R, 568 FS, 568 T, 568 M

[56] References Cited

U.S. PATENT DOCUMENTS

| | | | |
|---|---|---|---|
| 2,903,528 | 9/1959 | Kuhn | 200/38 BA |
| 2,921,151 | 1/1960 | Kral | 200/38 BA |
| 3,120,595 | 2/1964 | Cork et al. | 200/574 |
| 3,270,582 | 9/1966 | Barth | 74/568 R |
| 3,320,375 | 5/1967 | Aldrich et al. | 200/47 |
| 3,483,344 | 12/1969 | Hermle | 200/574 |
| 3,792,627 | 2/1974 | Tarello | 74/568 FS |
| 3,839,925 | 10/1974 | Ficken et al. | 74/568 R |
| 4,031,339 | 6/1977 | Koch | 200/38 BA |
| 4,238,654 | 12/1980 | Hermle | 200/574 |
| 4,424,423 | 1/1984 | Hermle | 200/31 R |

OTHER PUBLICATIONS

Automatic Timing and Controls Co., "Rotating Cam Limit Switch (Prior Art)"; 3 pages, KIP; 5/13/88.
McGraw-Edison, Gemco Catalog, Sec. 1980 (pp. 1-40) and Sec. 1981 (pp. 1-20); 6/83.
Automatic Timing & Controls Co. Catalog (pp. face, 45-50, 95-100, 105, end) 7/79.

*Primary Examiner*—J. R. Scott
*Attorney, Agent, or Firm*—Myers & Ehrlich, Ltd

[57] ABSTRACT

The rotating cam limit switch includes a hub, a position screw arm, a position screw, a position wheel, a retractable cam, a dwell wheel, a dwell screw, a dwell screw arm, a spring wave washer and a locking ring. The hub is to be mounted on a rotating shaft which is to activate a non-rotating switch assembly. Near a first axial end, an integral position screw arm and position flange extend radially from the integral hub. The position screw arm carries a position screw, which is snap fitted onto the arm, which operatively engages the position wheel rotatably mounted on the hub next to the position screw arm. The dwell wheel is also rotatably mounted with respect to the hub. The dwell wheel is operatively engaged by the dwell screw carried by the dwell screw arm integrally formed with a dwell flange. The dwell screw arm is fixed to the hub by hub a anti-rotation device. The wave washer and the locking ring, mounted near a second axial end of the hub, compress the rotating components together. A cam chamber defined by the position and dwell wheels receives a retracted portion of the flexible elongate retractable cam. The dwell wheel operatively engages the cam to vary the length of the exposed surface of the cam. The exposed surface of the cam activates the switch of the switch assembly. Differing indicia of degree position and dwell are marked about the circumference of the position and dwell wheels.

34 Claims, 7 Drawing Sheets

ROTATING RETRACTABLE CAM LIMIT SWITCH

RELATED APPLICATION DATA

This application is a continuation in part of U.S. patent application Ser. No. 07/166,654, filed Mar. 11, 1988, abandoned, by the same inventors as this application and assigned to the same assignee as this application. A claim for priority for the common elements between the applications is made under the authority of 35 U.S.C. 120, and the specification and drawing of application Ser. No. 07/166,654 is incorporated by reference herein.

BACKGROUND OF THE INVENTION

This invention relates to the field of providing a binary indication of the position of a rotating shaft for a duration of shaft rotation. The invention particularly relates to rotating cam limit switches.

Rotating cam limit switches have long been known and used to control various operations associated with machinery employing a rotating shaft. Examples of rotating cam limit switches are described in printed publications including issued U.S. Pat. Nos. 3,839,925 (to Ficken et al.), 3,792,627 (to Tarello), and 4,031,339 (to Koch). Another example of a rotating cam limit switch has been on sale for more than a year. The sold limit switch consists of a cam hub wheel, two cam wheel actuators, two adjusting wheels and two elastomeric ring actuators. Each wheel actuator may activate a switch for about 180 degrees in a rotation by a positive fixed lobe extending partially around the wheel perimeter. The cam profile for activating the switch is developed by meshing the individual profiles of each wheel actuator and providing a positive dwell between 180 degrees and 356 degrees of rotation. The individual wheel actuator profiles may be meshed to provide a negative dwell between 4 degrees and 180 degrees of rotation. Dwells ranging from 4 degrees through 356 degrees of rotation are possible with a transition taking place at 180 degrees between positive and negative dwell. Switch activation will be affected by the transition since normally open switch contacts would become normally closed contacts or conversely, normally closed switch contact would become normally open contacts. Each wheel actuator is separately adjusted by an associated adjusting wheel with an eccentric hub. An elastomeric ring gear is fitted over the eccentric hub and the gear engages a hub gear having internal teeth on the cam hub wheel, and engages an actuator gear having internal teeth on the wheel actuator. There is a one tooth difference between the hub gear and the actuator gear. When the elastomeric ring gear is rotated, the wheel actuator rotates with respect to the hub wheel. A first adjustment, employing a special tool engaging the hub wheel, initiates the dwell (or position) and a second terminates the dwell in dependence on the first adjustment.

SUMMARY OF THE INVENTION

The rotating cam limit switch of the present invention includes a hub, a retractable cam, adjustable position means, adjustable dwell means, and switch means. The hub is affixed to a shaft, the angular position of which is to initiate activation of a switch for an angular duration or dwell. The hub carries the adjustable position means, the adjustable dwell means, and the retractable cam. The adjustable position means interfits with the hub to adjust the angular position of a leading edge of the retractable cam. The adjustable dwell means interfits with the hub to adjust the angular position of a trailing edge of the retractable cam. Switch means is activated by an exposed surface of the retractable cam. The adjustable position means should be first set to alter the position of the leading edge of the retractable cam. Then the adjustable dwell means should be set to alter the position of the trailing edge of the retractable cam without altering a previously set position. The retractable cam actuator may be adjusted for a positive dwell between about 18 degrees and 356 degrees of rotation, eliminating the transition from positive dwell to negative dwell for over 94 percent of a rotation. The switch means activation will be affected only for negative dwells from 4 degrees through 18 degrees of rotation.

DETAILED DESCRIPTION OF THE DRAWING

Figure 1:
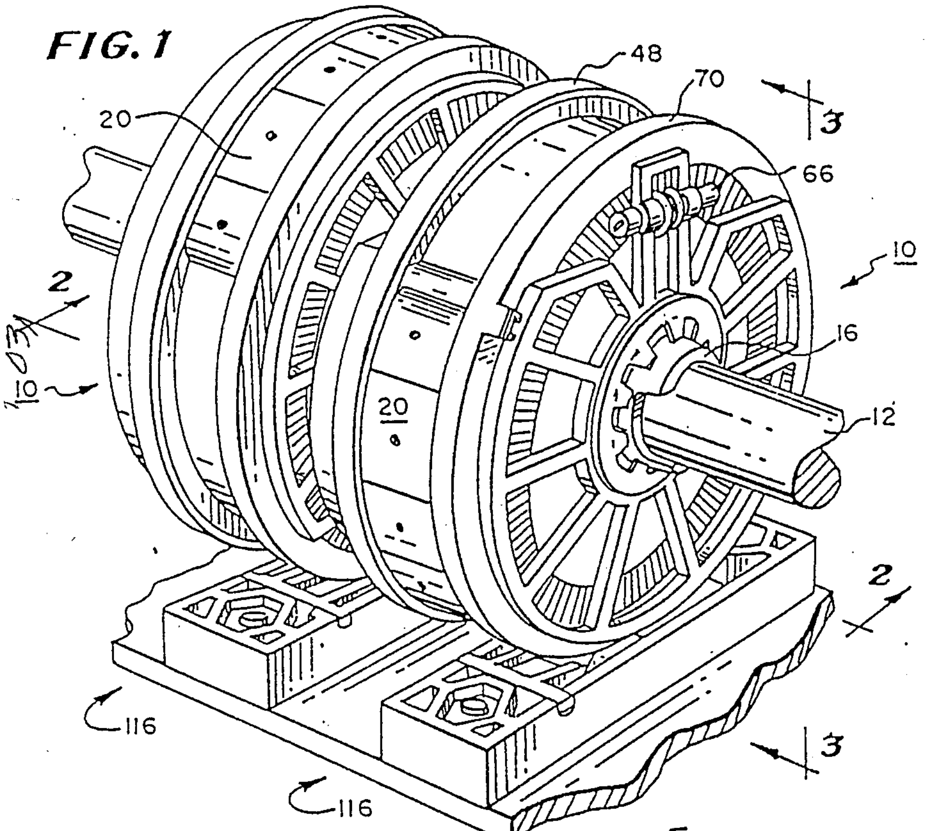
FIG. 1 is a perspective view of two ganged rotating cam limit switches of the present invention.
Figure 2:
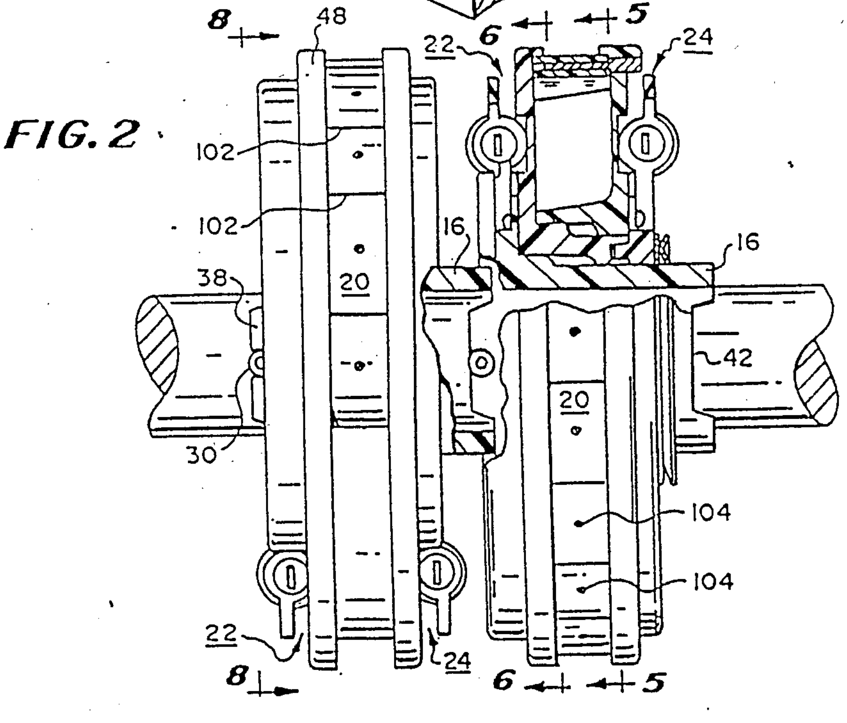
FIG. 2 is a front elevation and section along the lines 2—2 of FIG. 1.
Figure 3:
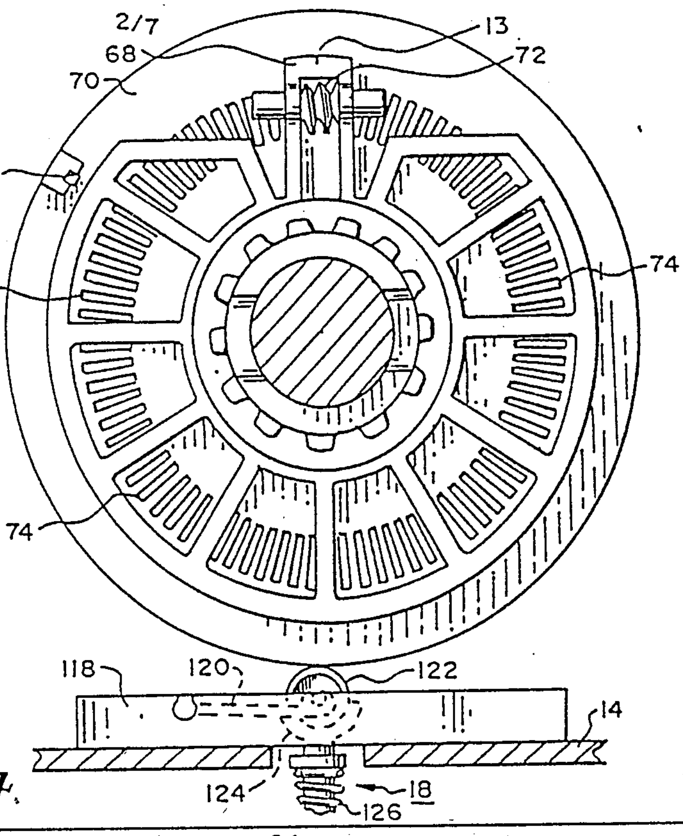
FIG. 3 is a side elevation along the lines 3—3 of FIG. 1.
Figure 6:
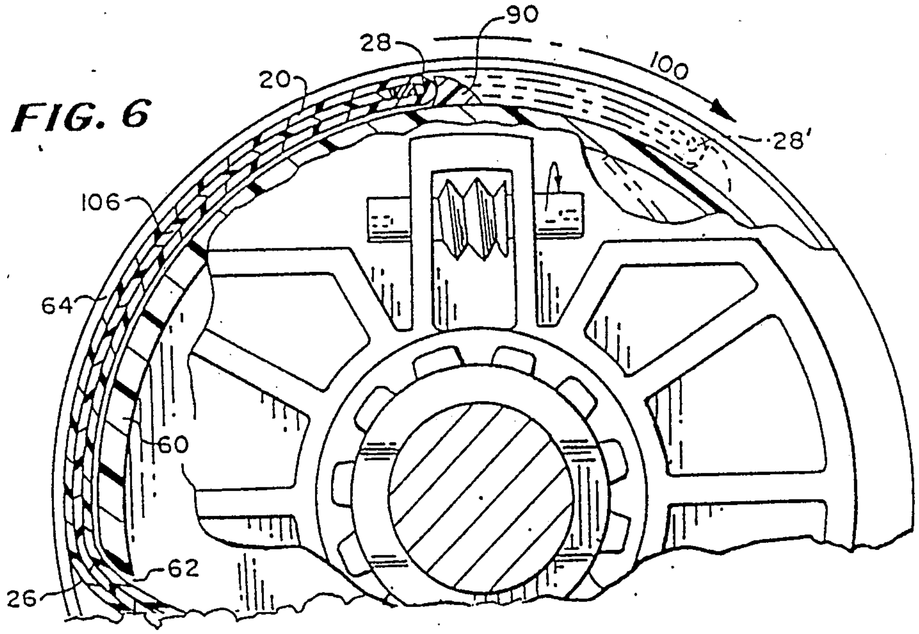
FIG. 6 is a side elevation of the rotating cam switch of the present invention partially in section showing the leading and trailing edges of the exposed portion of the retractable cam taken along lines 6—6 of FIG. 2.
Figure 7:
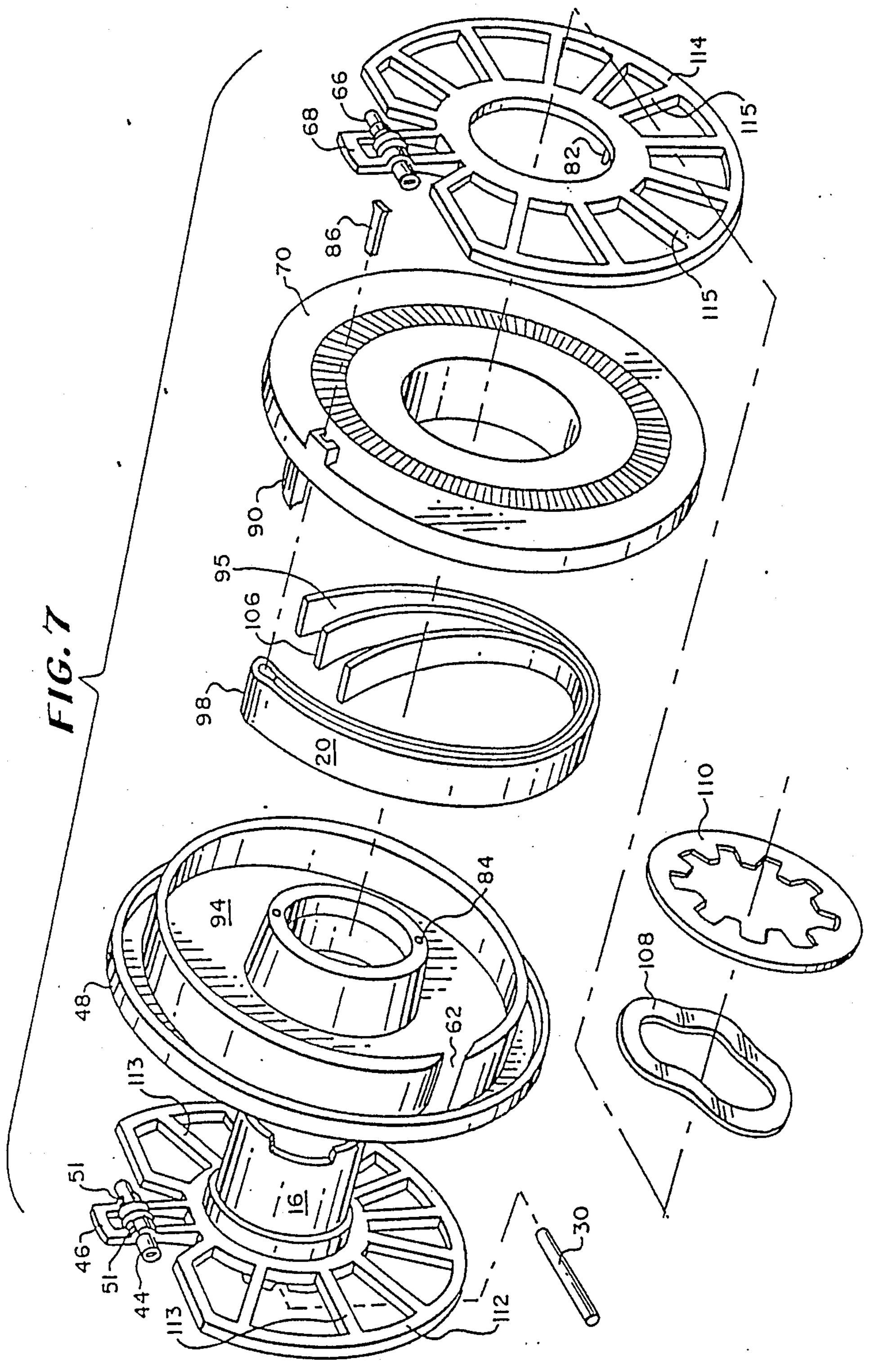
FIG. 7 is an exploded view of the rotating cam limit switch of the present invention.

FIG. 1 of the drawing shows two rotating cam limit switches 10 of the present invention mounted on a rotatable shaft 12 within a base of an enclosure 14. As shown in FIGS. 1 and 2, each switch 10 includes a hub 16 upon which rotating elements of the switch 10 are mounted and switch means 18 (FIG. 3). The rotating elements of switch 10 include a retractable cam 20, an adjustable position means 22, and an adjustable dwell means 24. Retractable cam 20 has an exposed surface between leading edge 26 and trailing edge 28 (FIG. 6). The switch means 18 is activated by the exposed cam surface as shown in FIG. 3. Adjustable position means 22 adjusts and fixes the angular position of leading edge 26 with respect to hub 16 and shaft 12 to which hub 16 is affixed by shaft pin 30. Adjustable dwell means 24 adjusts add fixes the angular position of trailing edge 28 with respect to leading edge 26.

Hub 16 is a hollow cylindrical member having a central through bore 32 into which shaft 12 is received. At one axial end of hub 16, pin retaining structure 34 receives shaft pin 30 to rotationally fix hub 16 to shaft 12. A first abutment means 36 located at a first axial end of the hub 16 restrains relative rotation of switch 10. First abutment means 36 is preferably a pair of lugs 38 diametrically opposed to each other and defines pin retaining structure 34. At a second axial end of hub 16, second abutment means 40 interfit with the first abutment means 36 of an adjacent switch 10 to restrain relative rotation between adjacent switches 10. Preferably, second abutment means 40 is a pair of slots 42 receiving lugs 38 of an adjacent switch 10.

Adjustable position means 22 includes position screw 44, carried on position screw arm 46 affixed to hub 16, operatively engaging position wheel 48.

Figure 8:
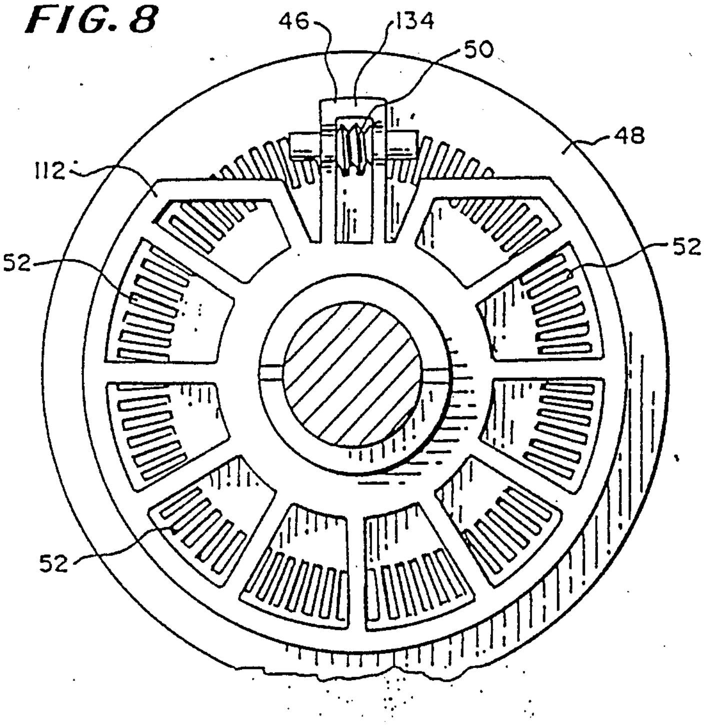
FIG. 8 is a side elevation of FIG. 2 along the lines of 8—8.

As shown in FIG. 8, screw 44 includes position threads 50 which engage position slots 52 displaced adjacent the periphery of position wheel 48. Position screw 44 has slot 54 for receiving a bit of a standard screwdriver. To each side of threads 50, grooves 51 receive screw brackets 56 on position screw arm 46 so that position screw 44 may be snap fitted onto position screw arm 46. So long as arm 46 operatively engages position wheel 48, position wheel 48 will be selectively restrained from rotation with respect to hub 16.

Position wheel 48 includes a through bore 58 through inner cylindrical flange 59 which is inserted over a portion of hub 16. As position screw 44 is rotated, position wheel 48 rotates on hub 16. The position wheel 48 includes outer cylindrical flange 60. Outer cylindrical flange 60 is interrupted by extension slot 62 through which retractable cam 20 protrudes to define leading edge 26. Position screw 44 angularly adjusts the postion of leading edge 26. Position wheel 48 further includes a position guidance flange 64 which is also cylindrical radially outward of the outer cylindrical flange 60.

Adjustable dwell means 24 is similar in structure to adjustable position means 22. Adjustable dwell means 24 includes dwell screw 66, carried on dwell screw arm 68 affixed to position wheel 48, operatively engaging dwell wheel 70.

Screw 66 includes dwell threads 72 which engage dwell slots 74 displaced adjacent the periphery of dwell wheel 70. Dwell screw 66 has slot 54 for receiving a bit of a standard screwdriver. To each side of threads 72, grooves (not shown) receive screw brackets 56 on dwell screw arm 68 so that dwell screw 66 may be snap fitted onto dwell screw arm 68. So long as arm 68 operatively engages dwell wheel 70, dwell wheel 70 will be selectively restrained from rotation with respect to position wheel 48.

Figure 5:
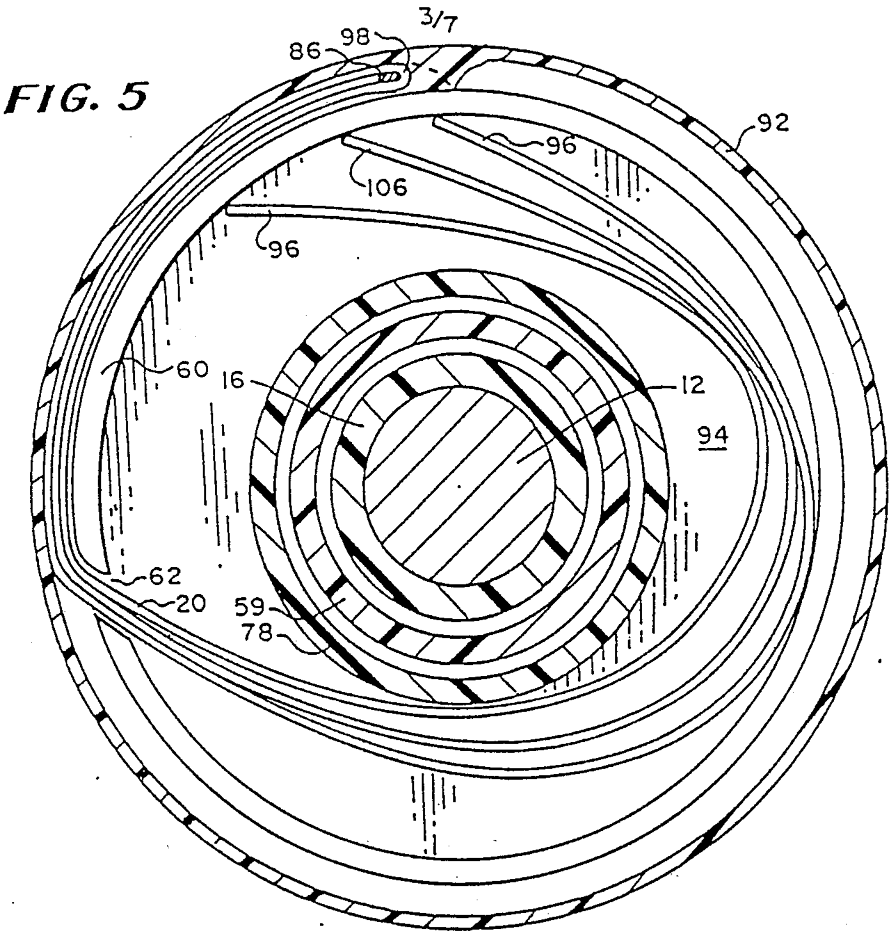
FIG. 5 is a cross section of the interior of the rotating cam limit switch of the present invention including a side elevation of the entire cam taken along lines 5—5 of FIG. 2.

Dwell wheel 70 includes a through bore 76 through dwell cylindrical flange 78 which is inserted over a portion of inner cylindrical flange 59 on position wheel 48. As dwell screw 66 is rotated, dwell wheel 70 rotates on the inner cylindrical flange 9. Dwell screw arm 68 has a through bore 80 which receives a portion of hub 16 and at least one position pin 82 which is received in dwell arm socket 84 defined in inner cylindrical flange 59. Position pin 82 and socket 84 are anti-rotation means preventing relative rotation between dwell screw arm 68 and position wheel 48. A cam pin 86 extends through pin hole 88 in dwell wheel 70 to interfit with retractable cam 20. Ramp 90 on dwell wheel 70 is adjacent to cam pin 86 and oriented so that its maximum radial length is adjacent to trailing edge 28 of retractable cam 20. Ramp 90 acts to extend activation of switch means 18 for a fixed increment of the outer surface of ramp 90 and may be regarded as part of the exposed surface of retractable cam 20. Dwell screw 66 angularly adjusts the position of trailing edge 28. Dwell wheel 70 further includes a dwell guidance flange 92, which is also cylindrical, radially outward of the dwell cylindrical flange 78. As best seen in FIGS. 5 and 6, the exposed surface of retractable cam 20 is restrained from radially outward movement by position guidance flange 64 and dwell guidance flange 92, and is supported by outer cylindrical flange 60. A cam chamber 94 for receiving the retracted portion of retractable cam 20 is defined between outer cylindrical flange 60, on the position wheel 48, and the dwell cylindrical flange 78 on dwell wheel 70.

Retractable cam 20 includes a flexible elongate strip 95 doubled on itself to form open ends 96 and closed end 98. Cam pin 86 is inserted into closed end 98. A pin hole could be used instead of a closed end. Ramp 90 and cam pin 86 act as extension means to expose and retract the exposed surface of retractable cam 20. When dwell wheel 70 is rotated in the direction of arrow 100, opposite the direction of rotation of shaft 12, the exposed surface of retractable cam 20 may be lengthened to move trailing edge 28 to position 28' (shown in phantom in FIG. 6). In one embodiment of the invention (shown in FIGS. 1 and 2), indicia 102 may be placed about the surface of retractable cam 20 at 20 degree intervals. Indicia 104 may be displaced 10 degrees from indicia 102. Indicia 102, 104 provide an indication of the dwell interval. If retractable cam 20 is fabricated from polytetrafluoroethylene, or a similar material, as is preferred, indicia 102 and 104 may be hot stamped into cam 20. A separation strip 106, preferably fabricated from polytetrafluoroethylene, separates the doubled portions of the flexible elongate strip 95 used to form open ends 96 and closed end 98 which is part of retractable cam 20.

A spring wave washer 108 is placed over a portion of hub 16 near an end opposite position screw arm 46 and an internally toothed locking ring 110 is placed over a portion of hub 16 nearer the end opposite position screw arm 46. Wave washer 108 and locking ring 110 cooperate to act as bias means for axially biasing the dwell screw arm 68, the dwell wheel 70, the position wheel 48, and the position screw arm 46 together.

A position flange 112 axially aligned with the position screw arm 46 extends about position wheel 48 near its periphery to further restrain axial movement of position wheel 48. The circumference of position flange 112 extends at regular circumferential intervals to either side of position screw arm 46 and is supported by position spokes 113. Similarly, a dwell flange 114 axially aligned with the dwell screw arm 68 extends about dwell wheel 70 near its periphery to further restrain axial movement of dwell wheel 70. The circumference of dwell flange 114 extends at regular circumferential intervals to either side of dwell screw arm 68 and is supported by dwell spokes 115. Position screw arm 46 is preferably integral with position flange 112. Similarly, dwell screw arm 68 is preferably integral with dwell flange 114. Further, integral position screw arm 46 with position flange 112 should be integrally formed with hub 16. Position flange 112, dwell flange 114, position screw arm 46, dwell screw arm 68, and hub 16 are preferably molded from a thermoplastic material, as is position wheel 48 and dwell wheel 70. The plastic preferred is MINLON 10B40 (TM of DuPont) a mineral reinforced NYLON 66 (TM of DuPont) or functionally equivalent material.

A roller follower assembly 116 is interposed between switch means 18 and the exposed surface of retractable cam 20 and outer cylindrical flange 60. Roller follower assembly 116 includes housing 118, swivel arm 120 pivotally mounted in housing 118, roller follower 122 rotating on swivel arm 120 within follower well 124 and engaging the exposed surface of cam 20 and outer cylindrical flange 60. Well 124 bears against switch means 18 and roller follower 122 is biased into engagement with the rotating cam 20 and flange 60 by spring means 126. Housing 118 is affixed to base 14 and is preferably fabricated like dwell wheel 70. Swivel arm 120 is preferably molded from DELRIN 500 (TM of DuPont) an acetal, or functionally equivalent material, as are screws 44, 66. Roller follower 122 is preferably molded from NYLON (TM of DuPont) or functionally equivalent material.

Switch means 18 will often be a limit switch for providing a binary indication of engagement and non-engagement by the exposed surface of retractable cam 20. However, switch means 18 should be understood to encompass all varieties of equivalents to include direct and remote activating electrical, electrical mechanical, proximately, magnetic, optical, and mechanical devices. For example, without limitation switch means 18 includes, electrical snap acting contact switches, electrical force open/spring close contact switches, pneumatic pressure/vacuum switches, optical, and magnetic switches.

Figure 9:
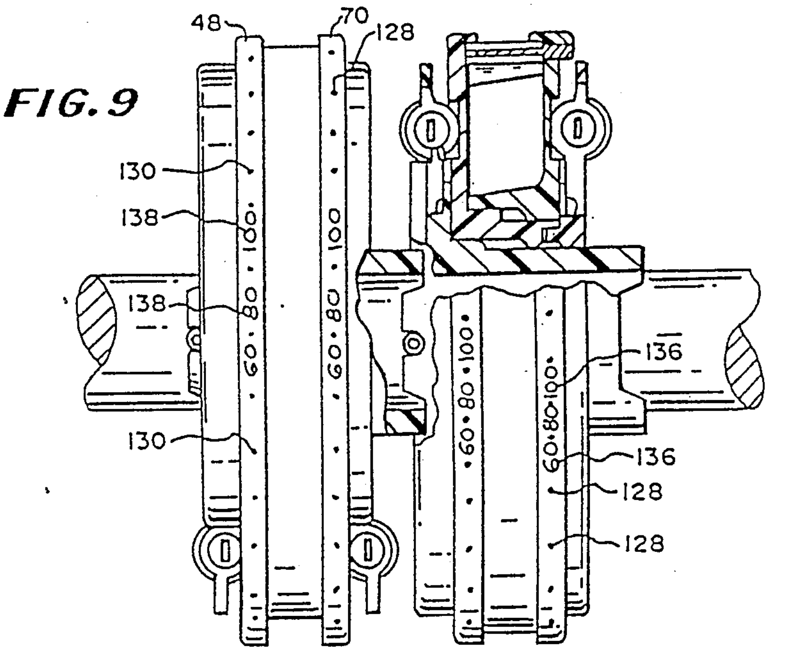
FIG. 9 is front elevation of an alternate embodiment of the rotating cam limit switch of the present invention.

As shown in FIG. 9, an indication of the set position and the set dwell may be provided by stamping dwell indicia 128 at 20 degree intervals on the circumference of the dwell wheel 70 and stamping position indicia 130 about the circumference of the position wheel 48. A dwell notch 132 can be formed at the circumferential center of dwell screw arm 68, as can a position notch 134 on position screw arm 46 to enhance the visual precision of the indication. Degree dwell numbers 136 may be stamped between dwell indicia 128 and degree position numbers 138 may be stamped between position indicia 130. To assist in setting position and dwell, the position screw 44, position indicia 130, and position number 138 may be a position color such as red. Distinguishably, dwell screw 66, dwell indicia 128, and dwell numbers 136 should be a dwell color such a white. It is advantageous to color the retractable cam 20 with the dwell color.

The components of retractable limit switch 10 snap together and are largely molded from plastic. As a result, it is more economical to manufacture.

FURTHER ALTERNATE EMBODIMENTS

Figure 10:
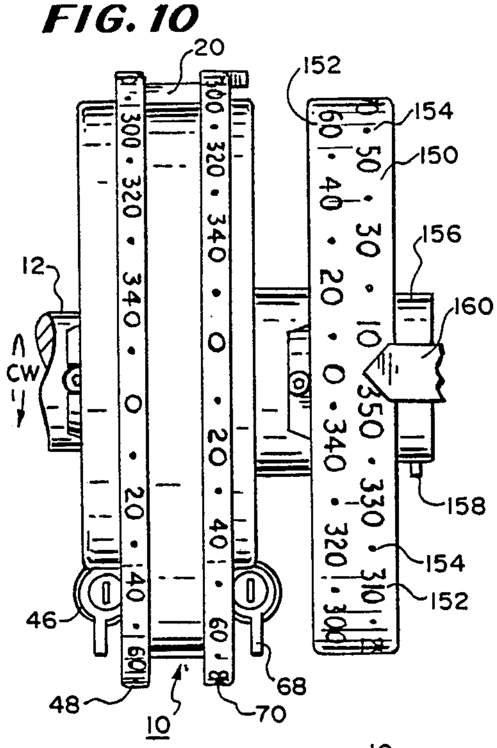
FIG. 10 is a partial top view of the rotating cam limit switch of the present invention employed with a timing dial.
Figure 11:
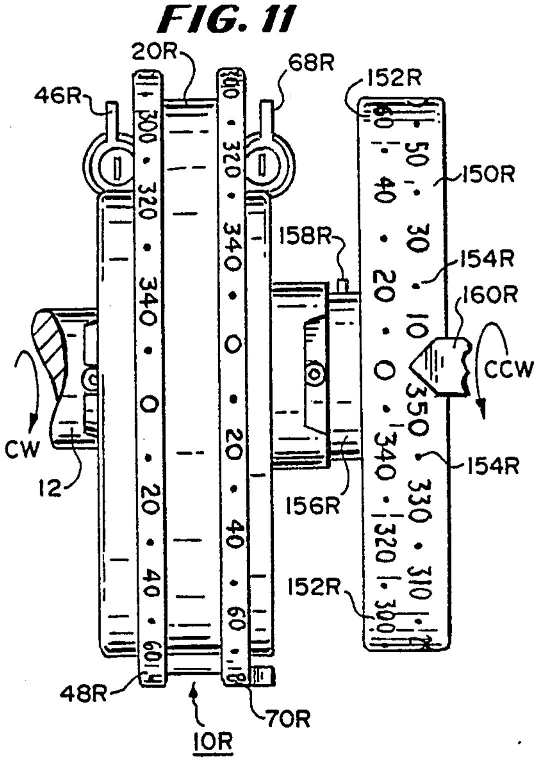
FIG. 11 is a view similar to that of FIG. 10 employing a timing dial and rotating cam limit switch adaptable for reverse rotation.
Figure 12:
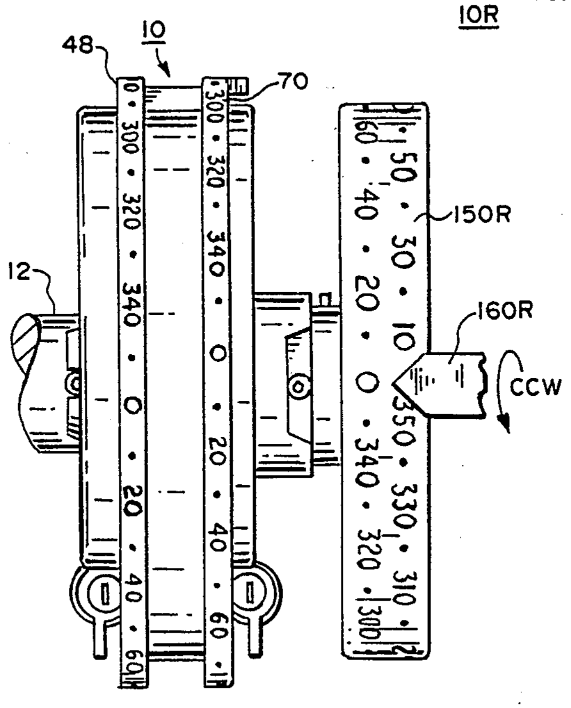
FIG. 12 is a view similar to that of FIG. 10 combining a normal rotation limit switch with a reverse rotation timing dial.

FIGS. 10 through 12 are intended to illustrate combinations of elements for standard and reverse rotation of shaft 12. A standard rotation limit switch is designated as numeral 10 in FIG. 10. Associated with the standard rotation limit switch 10 is standard timing dial 150. Timing dial 150 includes numerical indicators 152 adjacent indicia 154 intended to assist in determining the shaft position. It should be noted that timing dial 150 hub 156 projects upward from timing dial 150 when numerals 152 are upright.

Timing dial hub 156 is prevented from rotating with regards to shaft 112 by set screw 158. Indicator 160 may be affixed to a stationary structure such as an enclosure 14 for limit switch 10. Numerical indicators 152 and indicia 154 may be printed on timing dial 150 in a arbitrary standard color such as blue.

FIG. 11 illustrates limit switch 10R and timing dial 150R for reverse rotation of shaft 12. The view is rotated 180 degrees to illustrate an unanticipated property of reverse limit switch 10R and timing dial 150R. Similar features of reverse rotation limit switch 10R and timing dial 150R to those of standard rotation limit switch 10 and timing dial 150 are indicated by the same number with an "R" suffix. These features will not further be discussed. In the standard rotation limit switch, retractable cam 20 is to the left of the zero mark when the dwell and position wheels are adjusted to near zero, and position screw arm 46 and dwell screw arm 68 are to the right. In the reverse rotation limit switch 10R, the cam 20R is to the right while the position screw arm 46R and dwell screw arm 68R are to the left.

It was originally thought that standard rotation limit switch 10 could only be used on a standard rotating shaft 12, and that reverse rotation 10R could only be used on a reverse rotation shaft 12. It was unanticipated that the limit switches and associated timing dials could be intermixed providing two rules were followed. The first rule is:

the numerical indicators on the position wheel, dwell wheel, and timing dial must be read from the same direction. The second rule is:

the numbers on the timing dial must increase in count with the actual desired rotation of shaft 12.

FIG. 12 illustrates an embodiment where the two opposed rotation components are combined namely, limit switch 10 and timing dial 150R. Conventionally, standard rotation shafts are clockwise rotating.

Figure 4:
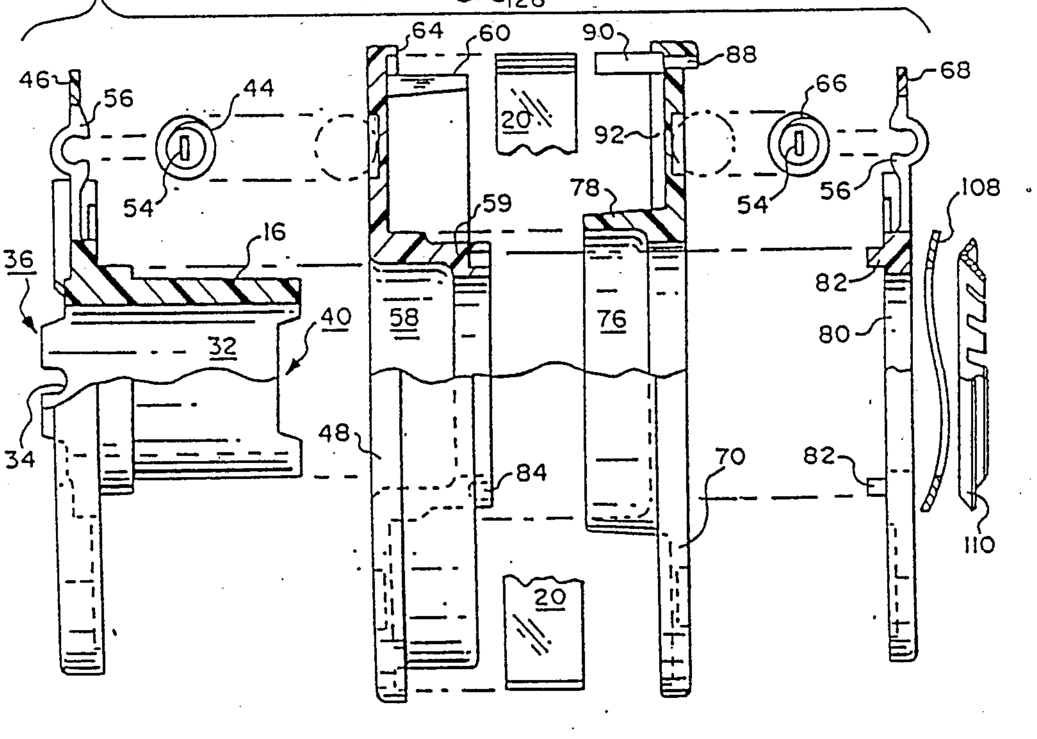
FIG. 4 is an exploded view, partially in section, of one rotating cam limit switch of the present invention.
Figure 13:
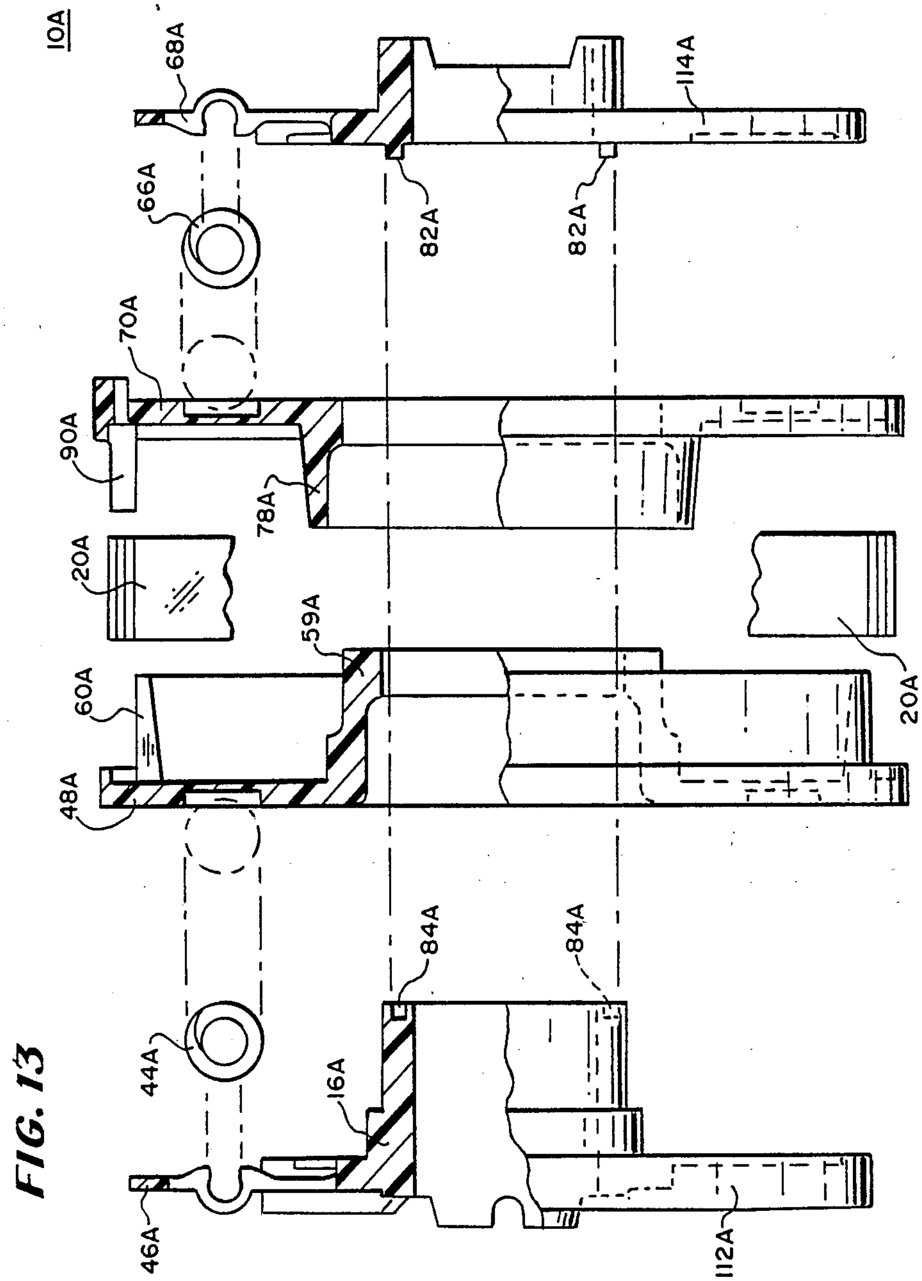
FIG. 13 is a further alternate embodiment of the present invention wherein anti-rotation means are employed between the dwell screw arm and the hub.

FIG. 13 illustrates a further alternate embodiment of the cam limit switch 10A of the present invention. Similar aspects of this embodiment to those of FIG. 4 are numbered with the same numeral with an "A" and will not further be described. The principal difference between the embodiments illustrated in FIG. 4 and FIG. 13 is that anti-rotation means of FIG. 13 namely position pin 82A, and socket 84A interfit to prevent relative rotation between dwell screw arm 68A and hub 16A. As a result of this arrangement, the dwell adjustment must be changed when the position adjustment is changed. However, the necessity of avoiding a transition from positive dwell to negative dwell for over 95 percent of a rotation is preserved, avoiding the necessity of converting between normally open and normally closed context in switch means 18 as a result of a dwell adjustment.

From the foregoing description, it will be apparent that modifications can be made to the rotating cam limit switch of the present invention without departing from the teachings of the invention. Also, it will be appreciated that the invention has a number of advantages, some of which have been described above and others of which are inherent in the invention. Accordingly, the scope of the invention is only to be limited as necessitated by the accompanying claims.

We claim:

1. A rotating cam limit switch having fixed and rotating elements comprising:

a rotating hub for mounting rotating elements of said switch to a rotating member;

a rotating retractable cam having an exposable cam surface;

rotating adjustable position means mounted to said hub for angularly adjusting the cam position, said position means being partially rotatable with respect to said hub;

rotating adjustable dwell means interfitted with said hub and said cam for varying the exposed length of the cam surface; and fixed switch means actuated by the cam surface for assuming a first state as the cam surface is contiguous to said switch means and returning to a second state when the cam surface is not contiguous to said switch means.

2. The rotating cam limit switch of claim 1, having fixed and rotating elements wherein:

said adjustable position means includes, a rotating position screw arm affixed to said hub;

a rotating position screw affixed to said screw arm, said position screw having position screw threads: and a rotating position wheel rotatably mounted on said hub for rotation with respect to said hub, said position wheel having a plurality of position slots which are engaged by the position screw threads.

3. The limit switch of claim 2 wherein said position wheel has an outer cylindrical flange to the side opposite said position slots, said outer cylindrical flange interrupted by a extension slot through which the retractable cam protrudes.

4. The limit switch of claim 3 wherein:

said position wheel has a position guidance flange to the side opposite said position slots radially outward of said outer cylindrical flange; and said retractable cam is supported by said outer cylindrical flange and restrained from outward radial movement by said guidance flange.

5. The limit switch of claim 4 wherein:

said hub has first abutment means at a first end for restraining relative rotation of said limit switch; and second abutment means at a second end interfitting with said first abutment means of an adjacent switch for restraining relative rotation between adjacent switches.

6. The limit switch of claim 5 wherein:

said position wheel has an inner cylindrical flange radially inward of said outer flange.

7. The limit switch of claim 2 wherein:

said adjustable dwell means includes a dwell position screw arm affixed to said hub;

a dwell screw affixed to said dwell screw arm, said dwell screw having dwell screw threads; and a dwell wheel rotatably mounted on said position wheel, said dwell wheel having a plurality of dwell slots which are engaged by the dwell screw threads.

8. The limit switch of claim 7 wherein said dwell screw arm and id hub have anti-rotation means which interfit to prevent relative rotation between them.

9. The limit switch of claim 8 wherein said dwell wheel has a dwell cylindrical flange which extends over said inner cylindrical flange to define a cam chamber between said dwell flange and an outer cylindrical flange on said position wheel and a dwell guidance flange which in cooperation with a position guidance flange on said position wheel restrains said retractable cam from radial outward movement.

10. The limit switch of claim 7 wherein:

said retractable cam is a flexible elongate member;

said dwell wheel has extension means interconnected with said retractable cam for extending and retracting said retractable cam.

11. The limit switch of claim 9 wherein:

said outer cylindrical flange is interrupted by an extension slot;

said retractable cam has the flexible elongate member doubled on itself to form an open end and a closed end with the closed end extended through the extension slot;

said dwell wheel includes a cam pin and a ramp, the cam pin extending into the closed end of said cam and the ramp adjacent but outside the closed end of said cam.

12. The limit switch of claim 11 wherein:

said position wheel has an outer cylindrical flange to the side opposite said position slots, said outer cylindrical flange interrupted by an extension slot through which the retractable cam protrudes, said position wheel has a guidance flange to the side opposite said position slots radially outward of said outer cylindrical flange; and said retractable cam is supported by said outer cylindrical flange and restrained from outward radial movement by said guidance flange.

13. The limit switch of claim 12 further including bias means associated with said hub for axially biasing the said dwell screw arm, said dwell wheel, said position wheel and said position screw arm together.

14. The limit switch of claim 13 wherein said bias means includes:

an internally tooth locking ring locked on said hub at an axial end opposite said position screw arm; and a wave spring placed over said hub between said locking ring and said dwell screw arm.

15. The limit switch of claim 14 further including:

a position flange extending adjacent said position wheel about the greater portion of the circumference of said position wheel; and a dwell flange extending adjacent said dwell wheel about the greater portion of the circumference of said dwell wheel.

16. The limit switch of claim 15 wherein:

said position flange is axially aligned with said position screw arm; and said dwell flange is axially aligned with said dwell screw arm.

17. The limit switch of claim 16 wherein:

said position flange is integrated with said position screw arm; and said dwell flange is integrated with said dwell screw arm.

18. The limit switch of claim 17 wherein:

said position flange, said dwell flange, said position wheel, said dwell wheel, and said hub are each molded from plastic.

19. The limit switch of claim 18 wherein said retractable cam is molded from polytetrafluoroethylene and further including a separation strip molded from polytetrafluoroethylene extending from adjacent the closed end of said retractable cam to adjacent the open end of said retractable cam between the doubled portions of said retractable cam.

20. The limit switch of claim 19 wherein the plastic of said position flange, said dwell flange, said position wheel, said dwell wheel, and said hub is MINLON.

21. The limit switch of claim 17 further including a roller follower interposed between the cam surface and an outer surface of said outer circular flange, and said switch means, said roller follower biased into engagement with the surfaces by spring means so that said switch means is actuated by said cam surface through said roller follower.

22. The limit switch of claim 17 wherein the exposed surface of said retractable cam bears indicia at regular intervals to indicate the dwell interval.

23. A rotating cam limit switch having fixed and rotating elements comprising:

a rotating hub for mounting rotating elements of said switch to a rotating member;

a rotating retractable cam having an exposable cam surface;

rotating adjustable position means mounted to said hub for angularly adjusting the cam position, said position means having a first position color and being partially rotatable with respect to said hub;

rotating adjustable dwell means interfitted with said hub means and said cam for varying the exposed length of the cam surface, said dwell means having a second dwell color readily distinguishable from said position color; and fixed switch means actuated by the cam surface for assuming a first state as the cam surface is contiguous to said switch means and returning to a second state when the cam surface is not contiguous to said switch means.

24. The rotating cam limit switch of claim 23 wherein said retractable cam has said dwell color.

25. The rotating cam limit switch of claim 24 having fixed and rotating elements wherein:

said adjustable position means includes;

a rotating position screw arm affixed to said hub near a first axial end of said hub and extending radially from said hub, said position screw arm having an inner radial end, and an outer radial end;

a rotating position screw snap fitted into said position screw arm near the outer radial end of said position screw arm, said position screw having said position color;

a rotating position wheel rotatably mounted on said hub for rotation with respect to said hub adjacent said position screw arm to the axial side opposite the first end of said hub, said position wheel extending radially from said hub and having a position circumference, said position wheel restrained from rotation with respect to said hub by being engaged by said position screw and bearing position indicia having said position color at regular circumferential intervals on the position circumference;

said adjustable dwell means includes, a rotating dwell screw arm affixed to said hub near a second axial end of said hub and extending radially from said hub, said dwell screw arm having an inner radial end, and an outer radial end;

a rotating dwell screw snap fitted into said dwell screw arm near the outer radial end of said dwell screw arm, said dwell screw having said dwell color; and a rotating dwell wheel rotatably mounted on said position wheel adjacent said dwell screw arm to the axial side opposite the second end of said hub, said dwell wheel extending radially from said hub and having a dwell circumference, said dwell wheel restrained from rotation with respect to said position wheel by being engaged by said dwell screw and bearing dwell indicia having said dwell color at regular circumferential intervals on the dwell circumference.

26. The rotating cam limit switch of claim 25 wherein:

said retractable cam is a flexible elongate member.

27. The rotating cam limit switch of claim 26 further including:

a cam chamber defined by said position wheel and said dwell wheel which receives a retracted portion of said cam;

a position flange axially aligned with said position screw arm and extending radially from said hub, said position flange abutting said position wheel near the position circumference about the position circumference at regular circumferential intervals to either side of said position screw arm;

a dwell flange axially aligned with said dwell screw arm and extending radially from said dwell wheel, said dwell flange abutting said dwell wheel near the dwell circumference about the dwell circumference at regular circumferential intervals to either side of said dwell screw arm.

28. The rotating cam limit switch of claim 27 wherein:

said hub, said position screw arm, and said position flange are integrally formed.

29. The rotating cam limit switch of claim 28 wherein:

said dwell screw arm and dwell flange are integrally formed.

30. The rotating cam limit switch of claim 29 wherein:

said position flange has a position flange circumference supported by position spokes; and said dwell flange has a dwell flange circumference supported by dwell spokes.

31. A rotating cam limit switch having fixed and rotating elements comprising:

a rotating hub for mounting rotating elements of said switch to a rotating member;

a rotating retractable cam having an exposable cam surface forming a cam lobe;

rotating adjustable position means mounted to said hub for angularly fixing the cam position with respect to said hub, said position means being partially rotatable with respect to said hub;

rotating adjustable dwell means interfitted with said hub and said cam for fixing the exposed length of the cam surface; and fixed switch means actuated by the cam surface for assuming a first state as the cam surface is contiguous to said switch means and returning to a second state when the cam surface is not contiguous to said switch means.

32. The rotating cam limit switch of claim 31 having fixed and rotating elements wherein:

said adjustable position means includes;

a position arm affixed to said hub near a first axial end of said hub;

a position wheel rotatably mounted on said hub adjacent said position arm to the axial side opposite the first end of said hub, said position wheel extending radially from said hub and having a position circumference, said position wheel selectively restrained from rotation with respect to said hub by being engaged by said position arm;

said adjustable dwell means includes a dwell arm affixed to said hub; and a dwell wheel rotatably mounted on said position wheel adjacent said dwell arm to the axial side opposite the second end of said hub, said dwell wheel extending radially from said hub and having a dwell circumference, said dwell wheel selectively restrained from rotation with respect to said hub by being engaged by said dwell arm.

33. The rotating cam limit switch of claim 32 further including:

bias means associated with said hub for axially biasing the said position arm, said position wheel, said dwell wheel and said dwell arm together.

34. The limit switch of claim 33 wherein said bias means includes:

an internally tooth locking ring locked on said hub at an axial end opposite said position arm; and a wave spring placed over said hub between said locking ring and said dwell arm.

* * * * *